Figure 1:
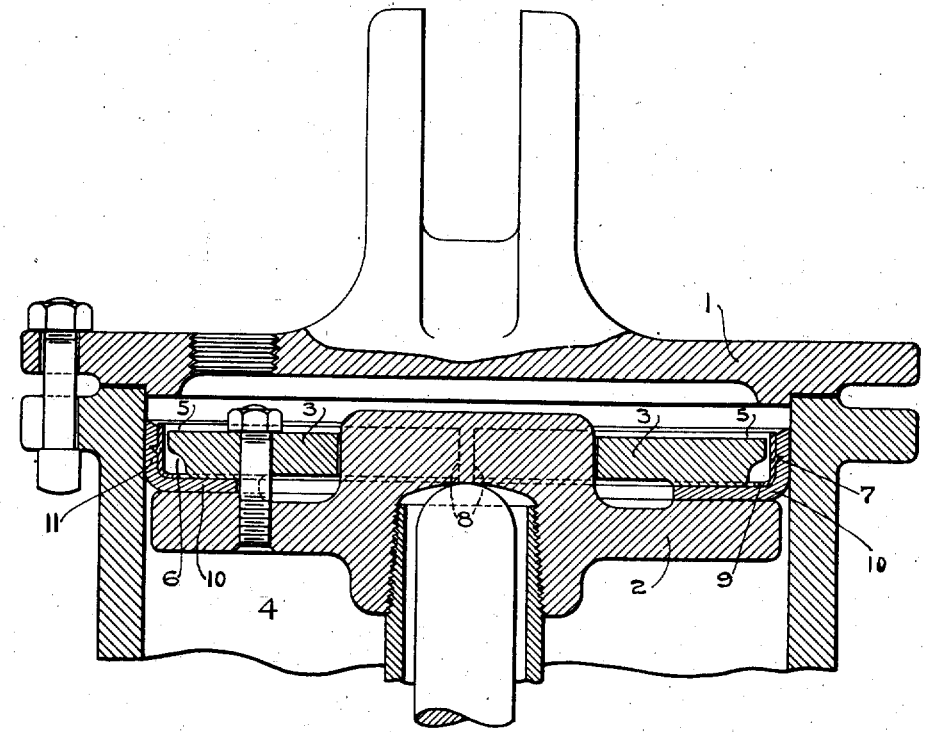

W. H. LIEBER.
PACKING EXPANDER.
APPLICATION FILED FEB. 20, 1911.

1,022,034.

Patented Apr. 2, 1912.

WITNESSES-
Ella Brickell
Tekla Bart

W. H. Lieber INVENTOR-

BY ATTORNEY.

UNITED STATES PATENT OFFICE.

WILLIAM H. LIEBER, OF MILWAUKEE, WISCONSIN, ASSIGNOR TO ALLIS-CHALMERS COMPANY, OF MILWAUKEE, WISCONSIN, A CORPORATION OF NEW JERSEY.

PACKING-EXPANDER.

1,022,034.   Specification of Letters Patent.   Patented Apr. 2, 1912.

Application filed February 20, 1911. Serial No. 609,647.

*To all whom it may concern:*

Be it known that I, WILLIAM H. LIEBER, a citizen of the United States, residing at Milwaukee, in the county of Milwaukee and State of Wisconsin, have invented certain new and useful Improvements in Packing-Expanders, of which the following is a specification.

This invention relates to improvements in the construction of packing expanders particularly adapted to be used for expanding cup leather packings such as are universally used, for instance, in the brake cylinders of air brakes.

The object of the invention is to provide a packing expander which is simple in its construction, efficient in its operation, and which can be easily and cheaply manufactured.

In using packing expanders for expanding cup shaped packings it has been found essential to have the expander coact along the greater part of the cylindrical portion of the packing. Several devices have been devised in which sufficient coaction between the expander and packing is obtained, but these devices have been difficult to manufacture since they require either a special stock or a great amount of machining to produce them. A feature of the present invention is to form the expander from sheet metal and as much as possible by the use of dies, thereby eliminating to a great extent the constructive difficulties.

For many years, packing expanders for the cup leather packings used in brake cylinders of air brakes, have consisted of a split ring formed of spring wire. This expander coacted with the cup leather packing near the bend thereof and was prevented from moving longitudinally of the cylindrical portion of the cup leather by the piston follower which was provided with an annular recess at its periphery adjacent the bend of the packing, to permit insertion of the expander ring. Thousands of air brake pistons thus constructed have been placed on the market and are at present in service.

In order to provide a sheet metal packing expander which is interchangeable with the old form of spring wire packing expander so that the piston followers now in use may still be utilized, provision must be made for preventing the expander from moving longitudinally of the cylindrical portion of the cup leather due to the large recess formed in the follower and necessary with the old form of expander ring.

It is an object of the present invention to provide a ring which will be locked against longitudinal shifting and which can be freely substituted for the old form of spring wire expander.

A clear conception of several embodiments of the invention may be had by referring to the accompanying drawing in which like reference characters designate the same parts in like or different views, although the invention is not limited to the particular art selected to illustrate same.

Figure 2:
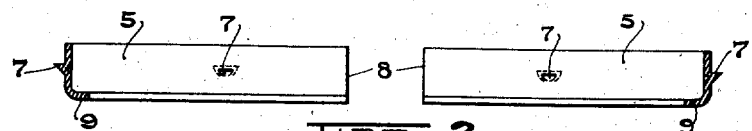
Figure 3:
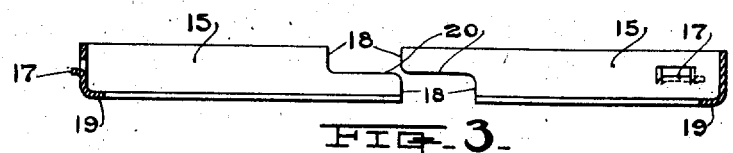

Figure 1 is a fragmentary central vertical section through a brake cylinder, piston and piston packing, showing an expander ring in position. Fig. 2 is a central vertical section through the packing expander ring shown in Fig. 1, the ring being expanded a maximum amount. Fig. 3 is a central vertical section through a modification of the packing expander ring, showing the ring expanded a maximum amount and showing also a modification of the formation of the ends of the ring.

The brake cylinder 4, the end of which is inclosed by a cylinder head 1, is bored to receive the continuous or circular cup shaped packing 10 composed of leather or other suitable material. The cup packing 10 is clamped along its radial portion between the piston 2 and the follower 3. If it is desired to substitute a continuous cylindrical packing for the cup packing 10, such substitute packing can be attached directly to the piston periphery. The outside diameter of the follower 3 is somewhat less than the internal diameter of the cylindrical free portion 11 of the packing 10, thus forming an annular space between these members. An annular recess 6 is formed in the follower 3 adjacent the piston and near the bend of the packing 10 and permits insertion of a wire packing expander ring of the old type within the piston.

The discontinuous packing expander ring 5, see Figs. 1 and 2, is formed of sheet metal and is L-shaped in cross section, having its longer leg extending axially of the ring. The shorter leg 9 of the L extends inwardly into the annular recess formed in the follower 3. Holding points 7, which are preferably formed by outward punching or distorting the metal forming the body of the ring 5, extend outwardly from the periphery of the longer leg of the ring 5. The ends 8 of the discontinuous ring 5 are cut along planes parallel to the axis of the ring. With the ring 5 in position, see Fig. 1, the cylindrical portion or longer leg thereof bears against the cylindrical free portion 11 of the packing 10. The radial leg 9 of the ring 5 coacts against the inwardly projecting flat portion of the packing 10 and should be free from coaction with the follower 3. The holding points 7 are embedded within the cylindrical free portion 11 of the packing 10, thereby positively preventing displacement of the packing expander ring 5 axially of the packing 10, thus locking the members together.

In the modified form of discontinuous expander ring, see Fig. 3, the sheet metal ring 15 is again formed L-shaped in cross section having the short leg 19 extending into the annular recess of the follower 3, as in the preferred form of ring. Holding lips or projections 17, which are formed directly from the body metal of the ring 15, are adapted to fit in a circular recess not shown, formed in the cup shaped packing 10. The ends 18 of the discontinuous ring 15 are cut on planes parallel to the axis of the ring. The ends 20 of the ring 15 are cut along a plane perpendicular to the axis of the ring.

With the ring 15 inserted within a piston, the adjacent surfaces 20 coact thereby preventing bunching of the packing 10 due to inaccuracies in the bore of the cylinder 4. The longer leg of the ring 15 bears against the cylindrical free portion 11 of the packing 10, the outward pressure of the ring tending to maintain a tight joint between the packing 10 and cylinder 4. The shorter leg 19 of the ring 15, as shown, coacts against the radial leg of the packing 10, although such coaction is not essential. The ring 15 is prevented from longitudinal displacement relative to the packing 10 by the lips or projections 17 coacting in the groove formed in the packing 10. If the formation of a groove in the packing 10 is undesirable, the projections 17 can be formed with knife edges which would cut slits in the packing 10 into which the lips 17 would embed themselves.

It will be noted that this expander ring can be very easily constructed with the use of dies, or even by spinning or rolling the ring. The split ring could furthermore be used to replace any of the old forms of wire expander rings without necessitating reconstruction of the parts.

The expander ring 5, 15, is inserted in the piston, while the follower 3 is removed therefrom, by contracting the ring until the ends nearly meet. While in this contracted condition, the ring 5, 15, is inserted within the free cylindrical portion 11 of the continuous circular packing 10 until the short leg 9, 19, of the ring 5, 15, abuts against the flat portion of the packing 10 or piston body. The discontinuous ring 5, 15, is then permitted to expand until the longer leg thereof coacts against the free cylindrical portion 11 of the packing, pressing same against the cylinder wall.

It should be understood that it is not desired to be limited to the exact details of construction shown and described, for obvious modifications will occur to a person skilled in the art.

It is claimed and desired to secure by Letters Patent,—

1. In combination with a cylindrical packing, a self-expansible ring having a cylindrical surface adapted to bear against said packing, and means on said ring and embedded in the body of said packing for locking said ring and packing against relative axial displacement.

2. In combination with a cylindrical packing, a self-expansible ring having a circular peripheral surface adapted to bear against said packing, and means projecting beyond said peripheral surface of said ring and embedded in the body of said packing for locking said ring and packing against relative axial displacement.

3. As an article of manufacture, an expansible packing expander ring formed from a continuous strip of material having at all portions of its length an L-shaped cross-section, said ring having projections extending outwardly from its periphery for locking said ring to the packing.

4. As an article of manufacture, a sheet-metal packing expander ring formed from a continuous strip of metal having at all portions of its length an L-shaped cross section, said ring having projections extending from its outer surface for locking said ring to its packing.

5. As an article of manufacture, a sheet-metal self-expansible spring packing expander ring having a cylindrical portion, said cylindrical portion being distorted to form projections extending beyond the outer surface thereof and adapted to be embedded directly in the packing to lock said ring to its packing.

6. In combination with a continuous circular packing, a sheet metal spring ring of L-shaped cross section bearing directly against said packing, and means formed on said ring and projecting into said packing for locking said ring and packing together.

7. In combination, an annularly recessed piston, a circular packing fastened to said piston and having a free portion extending axially across and beyond said recess, and an expander ring having at all portions thereof an L-shaped cross-section in contact with and locked directly to said free portion of said packing, one leg of said L extending into said recess.

8. In combination with a cylindrical packing, an expander ring within said packing, and means formed integral with said ring and embedded in the body of said packing to prevent relative axial displacement of said ring packing.

In testimony whereof I affix my signature, in the presence of two witnesses.

WILLIAM H. LIEBER.

Witnesses:
CHAS. L. BYRON,
ROB. E. STOLL.

Copies of this patent may be obtained for five cents each, by addressing the "Commissioner of Patents, Washington, D. C."

---

Correction in Letters Patent No. 1,022,034.

It is hereby certified that in Letters Patent No. 1,022,034, granted April 2, 1912, upon the application of William H. Lieber, of Milwaukee, Wisconsin, for an improvement in "Packing-Expanders," an error appears in the printed specification requiring correction as follows: Page 3, line 11, after the word "ring" insert the word *and;* and that the said Letters Patent should be read with this correction therein that the same may conform to the record of the case in the Patent Office.

Signed and sealed this 23rd day of April, A. D., 1912.

[SEAL.]

C. C. BILLINGS.

*Acting Commissioner of Patents.* expander ring having at all portions thereof an L-shaped cross-section in contact with and locked directly to said free portion of said packing, one leg of said L extending into said recess.

8. In combination with a cylindrical packing, an expander ring within said packing, and means formed integral with said ring and embedded in the body of said packing to prevent relative axial displacement of said ring packing.

In testimony whereof I affix my signature, in the presence of two witnesses.

WILLIAM H. LIEBER.

Witnesses:
CHAS. L. BYRON,
ROB. E. STOLL.

Copies of this patent may be obtained for five cents each, by addressing the "Commissioner of Patents, Washington, D. C."

Correction in Letters Patent No. 1,022,034.

It is hereby certified that in Letters Patent No. 1,022,034, granted April 2, 1912, upon the application of William H. Lieber, of Milwaukee, Wisconsin, for an improvement in "Packing-Expanders," an error appears in the printed specification requiring correction as follows: Page 3, line 11, after the word "ring" insert the word *and;* and that the said Letters Patent should be read with this correction therein that the same may conform to the record of the case in the Patent Office.

Signed and sealed this 23rd day of April, A. D., 1912.

[SEAL.]

C. C. BILLINGS.

*Acting Commissioner of Patents.*

Correction in Letters Patent No. 1,022,034.

It is hereby certified that in Letters Patent No. 1,022,034, granted April 2, 1912, upon the application of William H. Lieber, of Milwaukee, Wisconsin, for an improvement in "Packing-Expanders," an error appears in the printed specification requiring correction as follows: Page 3, line 11, after the word "ring" insert the word *and;* and that the said Letters Patent should be read with this correction therein that the same may conform to the record of the case in the Patent Office.

Signed and sealed this 23rd day of April, A. D., 1912.

[SEAL.]

C. C. BILLINGS,

*Acting Commissioner of Patents.*